United States Patent [19]

Ferber et al.

[11] Patent Number: 4,644,485

[45] Date of Patent: Feb. 17, 1987

[54] PHASE-LOCKED TIMING SYSTEM FOR A SPECTROPHOTOMETER

[75] Inventors: Alan C. Ferber, Hillside, Ill.; Morteza M. Chamran, deceased, late of Elmhurst, Ill., by Delories M. Chamran, legal representative

[73] Assignee: The Perkin-Elmer Corporation, Norwalk, Conn.

[21] Appl. No.: 651,196

[22] Filed: Sep. 14, 1984

[51] Int. Cl.[4] .................. G01J 3/433; G01R 23/00
[52] U.S. Cl. ................................. 364/569; 356/323; 364/525
[58] Field of Search ............... 364/484, 485, 486, 525, 364/565, 569; 356/323, 324, 325; 250/231 SE, 232, 233; 324/83 R

[56] References Cited

U.S. PATENT DOCUMENTS 4,305,663 12/1981 Perkins et al. ...................... 356/323
4,527,248 4/1985 Takase et al. ...................... 364/565

FOREIGN PATENT DOCUMENTS 2003247 4/1971 Fed. Rep. of Germany ...... 356/325

Primary Examiner—Felix D. Gruber
Assistant Examiner—Daniel W. Juffernbruch
Attorney, Agent, or Firm—Ronald G. Cummings; Francis L. Masselle; Edwin T. Grimes

[57] ABSTRACT

A timing system for a spectrophotometer having a line driven chopper including a rotating disc with alternate open and opaque segments, index apertures in the disc spaced at invariant angular relationship to one of the open segments for providing indexing pulses having fixed time relationship to the light segments, and a programmable microcomputer assembly for generating a string of timing pulses for timing spectrophotometer operations and adjusting the rate of the timing pulses to provide a fixed number between indexing pulses in fixed phase relationship thereto.

5 Claims, 4 Drawing Figures

PHASE-LOCKED TIMING SYSTEM FOR A SPECTROPHOTOMETER

FIELD OF INVENTION

This invention relates to spectrophotometry and, more particularly, to a phase-locked timing system for a spectrophotometer.

BACKGROUND OF THE INVENTION

It is common practice in spectrophotometry to chop the light beam passing through the monochromator with a mechanical chopper having a plurality of apertures to pass the beam alternating with opaque segments to interrupt the beam. This has several advantages. In current digital systems specific photometric tasks can be assigned to handle the light segments of the beam while baseline corrections can be made on the dark intervening segments. These tasks can be assigned by a microcomputer in sequence during the open or light part of the chopper cycle, but must be properly phased or timed to be done on the same part of each light pulse or variations will result from differences in response to pulse shape in successive pulses. This phasing must be locked to the chopper frequency, to a particular time in the chopper cycle, even though the chopper is operated from a synchronous motor, which may be powered by more than one line frequency such as 60 Hz, domestic, or 50 Hz, foreign.

It is an objective of this invention to derive the chopper frequency from the line frequency, as this minimizes stray pickup in the measuring circuits.

It is a further objective of this invention to provide a microcomputer controlled photometric system that derives its timing internally rather than from the line derived chopper frequency for greater timing accuracy.

It is a further objective to initialize or phase this internal timing system at intervals corresponding to the chopper frequency.

It is a related object to phase this internal system to synchronize with a specific occurrence in the chopper light-dark sequence.

It is yet a further object to eliminate the necessity of operator preselection of the mode of microcomputer operation to correspond with a given power line frequency.

BRIEF DESCRIPTION OF THE INVENTION

The spectrophotometer of a presently preferred embodiment of this invention, which may be a fluorescence spectrophotometer, utilizes a simple balanced chopper comprising a disc having two diametrically opposite open apertures as light passing sectors, two intervening opaque light blocking sectors, and two index holes also diametrically opposed. The chopper disc is rotated by a synchronous motor which is driven from the line at 3600 rpm for a 60 Hz supply or at 3000 rpm for a 50 Hz line. In this embodiment a 45:12 reduction afforded by gears and a timing belt drive yields a chopper disc rotation rate of 960 rpm (60 Hz) or 800 rpm (50 Hz). The chopping frequency is thus 32 pulses per second (60 Hz) or 26⅔ pulses per second (50 Hz). An optical interruptor, comprising a small light source projecting light through the index holes of the chopper when in line with this source to a phototransistor pickup, provides sharply defined phasing pulses at the same rate as the chopping frequency and timed to a specific orientation of the hopper disc and, hence, to a repetitive time relationship to the start of each light section of the chopper cycle.

Each index pulse checks a timer which generates pulses at a microcomputer programmable rate. These pulses time the various tasks to be carried out during the chopper cycle. When the next index pulse occurs the microcomputer measures the time since the last timing pulse and reprograms, if necessary, the rate of the timing pulse sequence. The chopper period is precisely divided into 10 timer periods (60 Hz) or 12 periods (50 Hz), each 3.125 milliseconds in duration, and equivalent frequency of 320 Hz. This time base also controls a number of stepper motors for wavelength scanning and the like. The computation establishing the phasing of this time base thus locks the chopper indexing to the chopper rotation in the proper time relationship.

At system start-up time the rate at which index pulses occur is measured first. The software then determines from this whether the line frequency is 50 or 60 Hz. An initial value is given to the timer and the phase locking procedure is then activated.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other assemblies for carrying out the various purposes of the invention. It is important, therefore, that this disclosure be regarded as including such equivalent assemblies as do not depart from the spirit and scope of the invention.

One embodiment of the invention has been chosen for purposes of illustration and description, and is shown in the accompanying drawings forming a part of the specification.

DETAILED DESCRIPTION OF A PRESENTLY PREFERRED EMBODIMENT OF THE INVENTION

Figure 1:
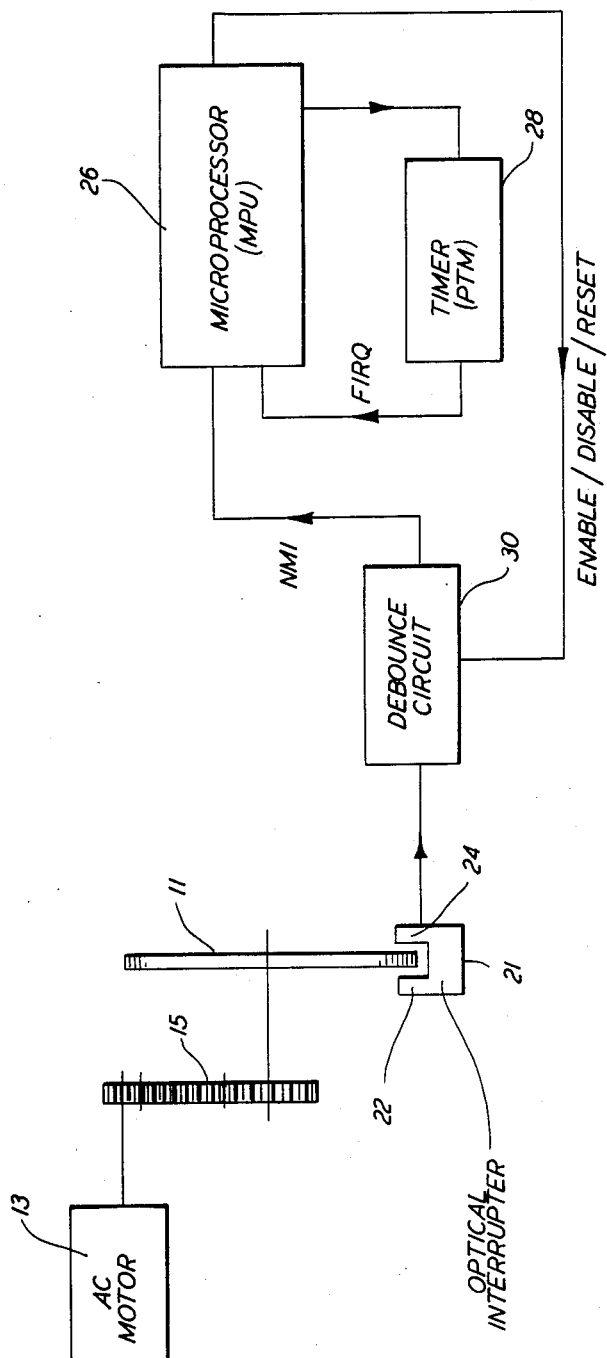
FIG. 1 is a simplified block diagram of the phasing system.

Referring to FIG. 1 a chopper disc 11 is driven in a conventional manner by a small synchronous motor 13, which may be of either the variable reluctance or the variable hysteresis type, self starting, and designed to operate on the desired line frequencies, typically 60 Hz or 50 Hz. While a two pole motor is used in the illustrated embodiment, it is obvious that a motor of more poles and lower speed can be used as long as the gear and belt drive 15 to the chopper results in a suitable chopper speed. The selection of chopper speed is determined by optical and electronic factors that are known to the art and is not restrictive to the operation of this invention. For reasons of available computer programming time and convenient circuit constants it is presently preferred to use a rotational speed of 960 rpm at 60

Hz or 800 rpm at 50 Hz for the chopper disc. The motor speed and step down ratio have been chosen accordingly.

Figure 2:
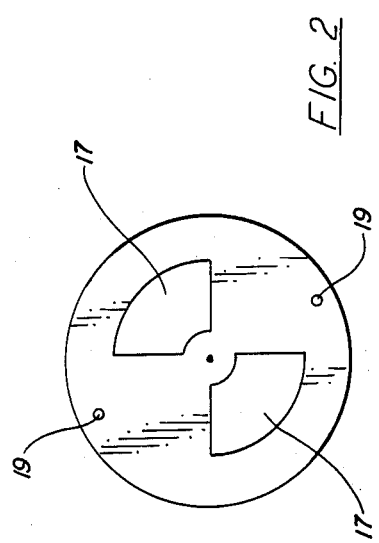
FIG. 2 is a plan view of the chopper disc.

Referring now to FIG. 2, which shows a plan view of the chopper disc, it will be seen that two large diametrically opposed openings 17 are provided in the interests of spin balance and freedom from vibration. The path of the optical beam through the spectrophotometer is routed to pass through one of these windows at a time so that each alternately passes the beam as the disc rotates. A substantially equal period during which the beam is occluded is interposed between each two open periods. As a result the optical beam is chopped into a succession of equal length light pulses with intervening dark spaces. The photometric system converts each light pulse in a generally known manner into an electrical signal pulse for measurement purposes. In present digital systems, unlike analog systems, each electrical pulse is then subjected to a series of timed operations directed by a microprocessor. These operations lead to the desired evaluation of the photometric data.

FIG. 2 also shows two small index holes 19 in the chopper disc, which provide two index pulses per revolution for maintaining the proper time relationship of the digital measuring operations to the time of the chopper light/dark periods as will be discussed more fully hereinafter. These index pulses are provided by an optical interruptor 21, FIG. 1, which embraces the edge of the disc and projects a beam of light from a small lamp 22 on one side of the disc through the open index hole to a phototransistor 24 on the other side, when the index hole passes through the notch of the interruptor block.

Figure 3:
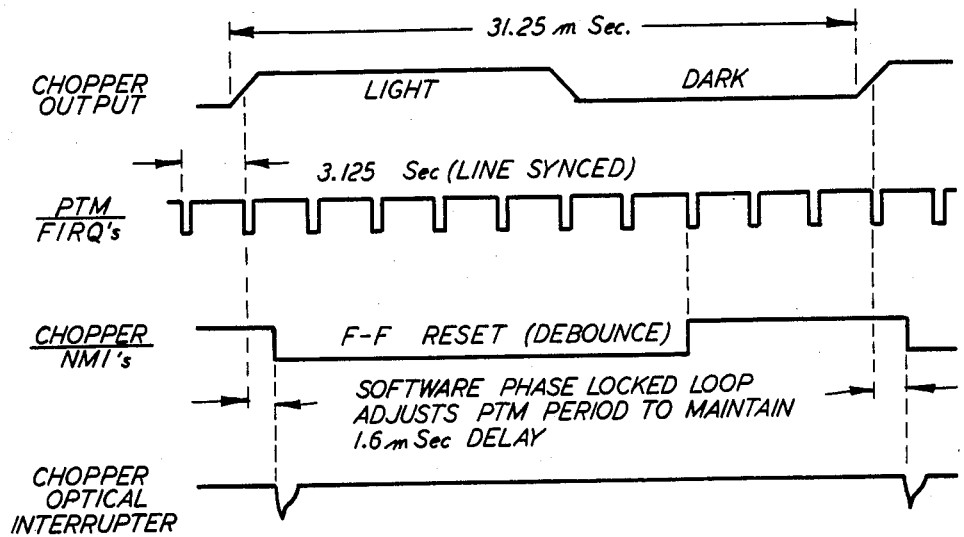
FIG. 3 shows a timing diagram for 60 Hz interrupts.
Figure 4:
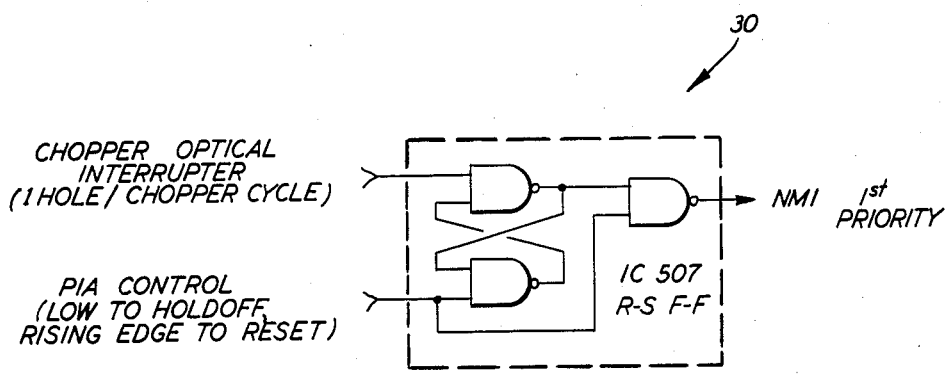
FIG. 4 shows a circuit schematic for the debounce circuit.

Referring now to FIG. 3, which is a diagram showing the timing relationships for interrupts generated during 60 Hz operation, the top line shows the pulse intensity of the light beam passed by the chopper during one half revolution. The bottom line shows the index pulses passed by the chopper index holes. The second line from the top shows a series of timing pulses generated by a Programmable Timer Module (PTM) shown at 28, FIG. 1. These pulses are used to provide Fast Interrupt Requests (FIRQ's) to the microprocessor for controlling the steps in handling the photometric data during the light and the dark parts of the chopper period. Such data steps comprise a sample and hold step for the output from the photomultiplier during the light period, and sample and hold steps for the photomultiplier high voltage, the output from the photomultiplier, the auto zero correction and others during the dark period. These pulses also provide the time base for operating various stepper motors used to change wavelength, slit width, etc. The PTM generates the timing pulses by counting 1 MHz pulses from a clock in the microcomputer in the Micro Processor Unit (MPU) 26, FIG. 1, in groups of 3125 and at each 3125 count outputs an FIRQ pulse. At each FIRQ the software resets the timer, increments a phase counter by one and carries out tasks specific to that position in the chopper cycle. The timer phase can be set by adjusting the timing of the reset. Unless this is done the spacing of these pulses from the PTM is maintained at 3.125 msec. (320 per second) which is the maximum stepper motor stepping rate. It is important, however, that the time phase of this timing pulse sequence be held in a fixed relationship to the time phase of the light pulse so that the data derived from the photometric processing of the electrical pulse resulting from the light pulse will maintain an invariant time relation to the growth and decay shape of the light pulse. The interval that must be held constant to accomplish this phase lock is indicated as the time difference of 1.6 msec between a non-maskable interrupt (NMI) and the previous FIRQ. These are shown in the third and second lines respectively of FIG. 3. The NMI edge is generated by the debounce circuit 30, FIG. 1, shown in detail in FIG. 4. The onset of light through the index hole 19 of the chopper produces a falling edge in the phototransistor signal and also in the output of the gating circuit of FIG. 4. (see also line 4, FIG. 3). A second input, from a Peripheral Interface Adaptor (PIA) chip then holds the status of the NMI until several FIRQ intervals later to provide a debounce device. Approximately 18 msec after the NMI edge, the debounce circuit is reset releasing the NMI.

When an NMI interrupt occurs the software interrogates the PTM to determine the time lapsed since the start of the last FIRQ, computes a differential value and adds a "damping factor". This computation is applied to the PTM which results in a corrected timer rate. This new rate prevails until it is again adjusted at the next NMI interrupt. This negative feedback technique thus locks chopper phases to the FIRQ phases through the periodic adjustment of the indexing time interval by varying the PTM rate.

During the start-up sequence only the rate at which the NMI interrupts occur is monitored. The software then determines from this rate whether the line frequency is 60 Hz or 50 Hz. An initial value is assigned to the PTM and the phase locking procedure above described is initiated. It will be apparent that other line frequencies could also be accommodated by this system. It will also be apparent that other components and software routines can be devised to provide a phase lock system without departing from the spirit and scope of this invention.

Although a certain particular embodiment of the invention has been herein disclosed for purposes of explanation, various modifications thereof, after study of the specification, will be apparant to those skilled in the art to which the invention pertains, and reference should accordingly be had to the appended claims in determining the scope of the invention.

What is claimed is:

1. A phase-locked timing system for a spectrophotometer comprising, in combination:
   first means for chopping a first light beam into alternate dark and light segments,
   second means for providing index pulses having fixed time relationship to the light segments generated by said chopping means,
   means for generating a string of equally spaced timing pulses between index pulses for timing spectrophotometer operations,
   means for adjusting the rate of said timing pulses to provide a fixed number of timing pulses between successive index pulses in fixed phase relationship thereto.

2. A phase-locked timing system according to claim 1 wherein said first means comprises a rotating disc with alternate open and opaque segments.

3. A phase-locked timing system according to claim 2 wherein said second means comprises index holes in said disc, each spaced in an invariant angular relationship to one of said open segments.

4. A phase-locked timing system for a spectrophotometer comprising, in combination:

first means for chopping a first light beam into alternate dark and light segments,
second means for providing index pulses having fixed time relationship to the light segments generated by said chopping means,
means for generating a string of equally spaced timing pulses between index pulses for timing spectrophotometer operations,
means for adjusting the rate of said timing pulses to provide a fixed number of timing pulses between successive index pulses in fixed phase relationship thereto, said adjusting means comprising means for establishing a fixed time interval between said index pulses and the immediately preceding timing pulses.

5. A phase-locked timing system according to claim 4 wherein said means for establishing includes means acting only on start-up for measuring the temporal spacing of said index pulses wherefrom the initial fixing of said fixed time interval is established.

* * * * *